United States Patent
Dudar

(10) Patent No.: US 9,682,609 B1
(45) Date of Patent: Jun. 20, 2017

(54) AUTONOMOUS VEHICLE DYNAMIC CLIMATE CONTROL

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/175,124

(22) Filed: Jun. 7, 2016

(51) Int. Cl.
*B60H 1/00* (2006.01)

(52) U.S. Cl.
CPC ..... *B60H 1/00764* (2013.01); *B60H 1/00785* (2013.01)

(58) Field of Classification Search
CPC ............ B60H 1/00764; B60H 1/00771; B60H 1/00842; B60H 1/00735; B60H 1/00392; B60H 1/00271; B60H 1/00878; B60N 2/002; G05D 1/024
See application file for complete search history.

(56) References Cited

U.S. PATENT DOCUMENTS

| | | | |
|---|---|---|---|
| 5,440,486 A * | 8/1995 | Rudzewicz | B60H 1/00842 165/42 |
| 8,044,782 B2 * | 10/2011 | Saban | B60N 2/002 340/438 |
| 8,286,437 B2 | 10/2012 | Sanders et al. | |
| 8,341,971 B2 | 1/2013 | Oyobe et al. | |
| 8,412,381 B2 | 4/2013 | Nikovski et al. | |
| 9,327,581 B2 * | 5/2016 | Enke | B60H 1/00878 |
| 2007/0221360 A1 * | 9/2007 | Hayashi | B60H 1/00271 165/42 |
| 2011/0172880 A1 * | 7/2011 | Tamura | B60H 1/00735 701/36 |
| 2012/0234930 A1 | 9/2012 | Wijaya | |
| 2015/0041113 A1 * | 2/2015 | Enke | B60H 1/00392 165/202 |
| 2015/0088374 A1 | 3/2015 | Yopp et al. | |
| 2015/0129192 A1 * | 5/2015 | Boss | B60H 1/00771 165/202 |
| 2015/0183293 A1 * | 7/2015 | Kim | B60H 1/00735 165/202 |
| 2015/0202770 A1 * | 7/2015 | Patron | G05D 1/024 700/245 |

FOREIGN PATENT DOCUMENTS

| | | |
|---|---|---|
| DE | 19902201 A1 | 8/2000 |
| JP | 3635782 B2 | 1/2005 |
| JP | 2015030292 A | 2/2015 |

* cited by examiner

*Primary Examiner* — Yuri Kan
(74) *Attorney, Agent, or Firm* — Frank MacKenzie; Bejin Bieneman PLC

(57) ABSTRACT

A passenger comfort system determines a travel time to a pickup location, detects a present cabin environment, determines a target cabin environment, and determines an environment adjustment time to adjust the present cabin environment to the target cabin environment. The passenger comfort system activates at least one vehicle climate control in accordance with the environment adjustment time and the travel time.

18 Claims, 2 Drawing Sheets

AUTONOMOUS VEHICLE DYNAMIC CLIMATE CONTROL

BACKGROUND

Autonomous vehicles assume certain vehicle tasks otherwise handled by a traditional vehicle driver. Autonomous vehicles can navigate to a specific destination by controlling the steering, acceleration, braking, etc., by relying on sensors or other resources to detect nearby vehicles, pedestrians, and objects in or near the road. The autonomous vehicle is controlled according to the signals output by these sensors.

DETAILED DESCRIPTION

Fully autonomous vehicles can operate in a non-occupant mode, meaning that the autonomous vehicle can travel to various locations without any occupants present. In some instances, the autonomous vehicle may pick up an occupant and then operate in either an autonomous occupant mode (where the vehicle operates autonomously but with one or more occupants) or a non-autonomous mode (where the vehicle is manually operated by one of the occupants).

Occupants would prefer to enter a climate-controlled vehicle cabin when the autonomous vehicle arrives at a pickup location. But it would be a waste of energy to run the climate control system while the autonomous vehicle is operating in a non-occupant mode the entire time the autonomous host vehicle is driving to the pickup location.

One solution includes incorporating a passenger comfort system into the host vehicle. The passenger comfort system dynamically controls the climate in the vehicle cabin so that the appropriate cabin environment is achieved by the time the autonomous vehicle arrives at the pickup location. As discussed in greater detail below, the passenger comfort system determines a travel time to a pickup location, detects a present cabin environment, determines a target cabin environment, and determines an environment adjustment time. The environment adjustment time may define the amount of time predicted to adjust the present cabin environment to the target cabin environment. The passenger comfort system activates at least one vehicle climate control in accordance with the environment adjustment time and the travel time. In other words, at some point while traveling to the pickup location, the passenger comfort system will activate the climate control system to provide the appropriate cabin climate. Thus, the occupants will enter a climate controlled vehicle when the autonomous vehicle arrives at the pickup location.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
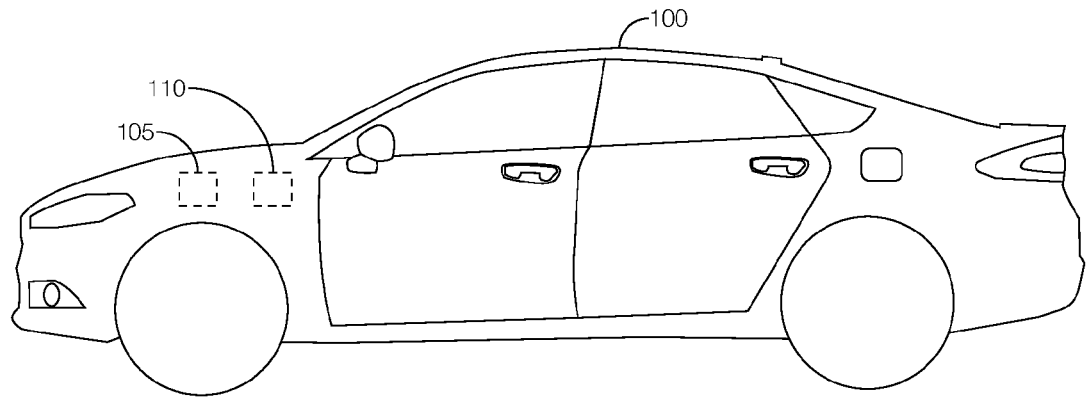
FIG. 1 illustrates an example autonomous host vehicle with a passenger comfort system for controlling a cabin environment while the host vehicle is operating in the autonomous mode and has no passengers.

As illustrated in FIG. 1, the autonomous host vehicle 100 includes a climate control system 105 and a passenger comfort system 110. Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 can operate in an autonomous (e.g., driverless) mode, a partially autonomous mode, and/or a non-autonomous mode. When operating in the autonomous mode, the host vehicle 100 can operate in an occupant mode where at least one occupant is present inside the host vehicle 100 or a non-occupant mode where no occupants are present inside the host vehicle 100. For instance, the host vehicle 100 may autonomously travel to a pickup location in a non-occupant mode and proceed from the pickup location to a different destination while operating in the occupant (autonomous) mode, a partially autonomous mode, or a non-autonomous mode.

The climate control system 105 is implemented via circuits, chips, or other electronic components that can control the climate inside the cabin of the host vehicle 100. The climate control system 105 is programmed to execute climate control adjustments such as changing the temperature of the cabin, defrosting one or more windows, or the like. To change the temperature, the climate control system 105 may, e.g., activate a heater or air conditioner and appropriate fans that are part of a vehicle HVAC system. To defrost one or more windows, the climate control system 105 may activate one or more fans located throughout the cabin that are pointed toward various windows. To defrost the rear window (backlight), the climate control system 105 may activate a backlight heater incorporated into the rear window. The climate control system 105 may consider other ways to adjust the cabin environment including, e.g., activating a heated seats feature, activating a heated mirror feature, activating a heated steering wheel feature, activating a cooled seats feature, activating a cooled mirror feature, activating a cooled steering wheel feature, at least partially opening one or more windows, opening or venting a moonroof or sunroof, etc.

Various climate controls may be activated according to the number of passengers who will enter the host vehicle 100 at the pickup location. For instance, if only one passenger is expected, the climate controls may be limited to heating or cooling only the driver seat. If multiple passengers are expected, multiple seats may be heated or cooled (e.g., only the front seats, only the rear seats, all of the seats, etc.). Further, the temperature controls may be adjusted according to where passengers are expected to sit (e.g., only the driver seat, only the front seats, only the rear seats, a mix of front and rear seats, etc.). If the host vehicle 100 will continue to operate in the autonomous mode even after picking up the passengers, the climate control system may not heat or cool the steering wheel.

The climate control system 105 may activate these and possibly other climate controls by outputting appropriate control signals to the appropriate components of the HVAC system, the body control module, or the like. Moreover, the climate control system 105 may be responsive to various control signals received from, e.g., sensors, the passenger comfort system 110, or both. The sensors, for instance, may measure the cabin temperature, the ambient (outside) temperature, frost on one or more of the windows, humidity in the cabin, or other characteristics that may be relevant to controlling the cabin environment.

The passenger comfort system 110 is implemented via circuits, chips, or other electronic components that can activates a climate control system 105 under various circumstances. For example, as discussed in greater detail below, the passenger comfort system 110 may determine a travel time to the pickup location and detect the present cabin environment. The present cabin environment may be determined from signals output by the climate control system 105, and specifically, the sensors, discussed above. The passenger comfort system 110 may determine a target cabin environment from, e.g., a user input, a database of user preferences, a default set of user preferences, or the like. With the present cabin environment and the target cabin environment, the passenger comfort system 110 may determine an environment adjustment time which defines the amount of time needed for the climate control system 105 to adjust the present cabin environment to the target cabin environment. In accordance with the environment adjustment time and the travel time to the pickup location, the passenger comfort system 110 can activate the climate control system 105 to adjust one or more climate controls in the cabin. With the passenger comfort system 110, the cabin will have the desired climate for the passenger by the time the host vehicle 100 arrives at the pickup location.

Figure 2:
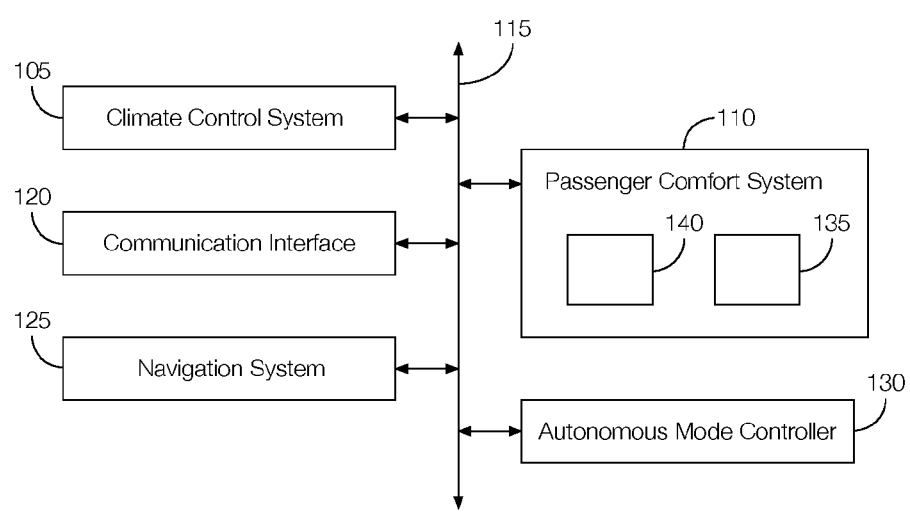
FIG. 2 is a block diagram showing example components of the passenger comfort system of FIG. 1.

Referring now to FIG. 2, the passenger comfort system 110 communicates with other components of the host vehicle 100 over, e.g., a communication network 115. The other components in the host vehicle 100, that may communicate with the components of the passenger comfort system 110, include the climate control system 105 (discussed above), a communication interface 120, a navigation system 125, an autonomous mode controller 130. The passenger comfort system 110, as shown in FIG. 2, includes a memory 135 and a processor 140.

The communication network 115 is implemented via wires, wireless circuits or chips, and possibly other electronic components. The communication network 115 permits wired or wireless communication between and among various components of the host vehicle 100. In one possible implementation, the communication network 115 includes a controller area network (CAN) bus. In addition or in the alternative, the communication network 115 may facilitate communication via any number of communication protocols such as Ethernet, Bluetooth®, Bluetooth® Low Energy, WiFi, or the like.

The communication interface 120 is implemented via circuits, chips, or other electronic components that can facilitate communication between the host vehicle 100 and remote devices such as a mobile phone, tablet computer, desktop computer, laptop computer, smartwatch, etc. The communication interface 120 may communicate with remote devices in accordance with any number of telecommunication protocols including, e.g., 3G, 4G, LTE, satellite communication protocols, etc. The communication interface 120 may be programmed to transmit and receive messages according to the telecommunication protocol. For instance, the communication interface 120 may be programmed to receive a pickup request from a remote device. The pickup request may include information such as, e.g., the pickup location and the target cabin environment, the number of passengers, etc. The communication interface 120 may transmit data from received messages to other components of the host vehicle 100 including, e.g., the passenger comfort system 110. In one possible approach, the communication interface 120 may forward the pickup location to the passenger comfort system 110, the navigation system 125, the autonomous mode controller 130, the memory 135, or any combination thereof. The communication interface 120 may forward the target cabin environment to, e.g., the passenger comfort system 110.

The navigation system 125 is implemented via circuits, chips, or other electronic components that can determine the present location of the host vehicle 100, determine a destination (such as the pickup location) of the host vehicle 100, and develop a route from the present location to the destination. The navigation system 125 may output the route to the passenger comfort system 110, the autonomous mode controller 130, or possibly other components of the host vehicle 100. In addition to the route, the navigation system 125 may output complimentary data concerning the route including, e.g., the predicted time until the host vehicle 100 arrives at the destination, traffic or construction along the route, etc. The navigation system 125 may use such data about the route to calculate a travel time to the destination (e.g., the pickup location) from the present location of the host vehicle 100. The navigation system 125 may output the travel time to the passenger comfort system 110.

The autonomous mode controller 130 is implemented via circuits, chips, or other electronic components that can autonomously control the host vehicle 100 in the autonomous or partially autonomous mode. For instance, the autonomous mode controller 130 may generate control signals in accordance with signals received from various autonomous driving sensors such as radar sensors, lidar sensors, vision sensors (i.e., cameras), ultrasound sensors, etc. The autonomous mode controller 130 may output the control signals to various vehicle subsystems such as a steering subsystem, a braking subsystem, a throttle subsystem, etc. For instance, the control signals output by the autonomous mode controller 130 may actuate the steering wheel, brake pedal, accelerator pedal, or the like. In one possible approach, the autonomous mode controller 130 receives signals, output by the navigation system 125, relative to the route to the pickup location or other destination.

The memory 135 is implemented via circuits, chips, or other electronic components that can electronically store data. For instance, the memory 135 can store data associated with the operations of the passenger comfort system 110, data output by the navigation system 125, messages received from the communication interface 120, etc. For example, the pickup location, route, target cabin environment, environment adjustment time, travel time, etc., may be stored in the memory 135. Moreover, the memory 135 may store computer-executable instructions and make such instructions available to the processor 140.

The processor 140 is implemented via circuits, chips, or other electronic components that can generate and output signals to activate various climate controls so that the target cabin environment is achieved before the host vehicle 100 arrives at the pickup location. The processor 140 may determine the travel time to the pickup location. The travel time may be received from the navigation system 125 or calculated by the processor 140.

The processor 140 may be further programmed to detect the present cabin environment. The present cabin environment may be based on signals output by the climate control system 105. For instance, the processor 140 may receive signals output by the climate control system 105 related to the cabin temperature, the ambient (outside) temperature, frost on one or more of the windows, humidity in the cabin, or other characteristics. The processor 140 may use such information to determine the present cabin environment.

The processor 140 may be further programmed determine the target cabin environment. The target cabin environment may be defined by wireless signals received from the remote device, and the processor 140 may determine the target cabin environment from such signals. The processor 140 may receive the target cabin environment directly from the communication interface 120 or by accessing the target cabin environment from the memory 135.

The processor 140 may be programmed to determine the environment adjustment time. The environment adjustment time may define the amount of time for the climate control system 105 to apply various climate controls that will achieve the target cabin environment given the present cabin environment. The environment adjustment time may be a composite of the amount of time to heat or cool the cabin, the amount of time to defrost one or more windows, etc. Because heating or cooling the cabin and defrosting the windows may be concurrent, the environment adjustment time may simply be the amount of time of the action that will take longer to complete. That is, if heating the cabin takes longer than defrosting the windows, the environment adjustment time may be the time it takes to heat the cabin. If certain climate control actions must be performed sequentially or at least partially sequentially, the environment adjustment time may be longer than it would take to perform any of the climate control actions individually.

Determining the environment adjustment time may include the processor 140 comparing the present cabin environment to the target cabin environment and determining the difference between them. An example includes the processor 140 comparing the present cabin temperature to the target cabin temperature. In this example, the environment adjustment time is based on the amount of time the climate control system 105 needs to heat or cool the present cabin temperature so that it is the same as the target cabin temperature. If the difference between the present cabin environment and the target cabin environment is minimal (i.e., not much of a temperature difference, not much of a humidity difference, no frost on any of the windows, etc.), the environment adjustment time may be relatively short, on the order of a minute or so. If the difference is larger (e.g., a larger temperature difference, a larger humidity difference, frost on one or more windows, etc.), the environment adjustment time may be relatively long, on the order of 5 minutes or possibly longer. The amount of time associated with each climate control may be based on a lookup table stored in the memory 135, received from the climate control system 105, etc.

The processor 140 may be programmed to activate various climate controls (adjusting the temperature, defrosting one or more windows, etc.) based on the environment adjustment time and the travel time. Activating the climate controls may include the processor 140 outputting a control signal to the climate control system 105 in accordance with the environment adjustment time and the travel time. That is, the processor 140 may output the control signal when the environment adjustment time is approximately equal to the travel time. Put another way, the processor 140 may command the climate control system 105 to begin applying various climate controls when the host vehicle 100 is the environment adjustment time away from the pickup location. By way of example, if the environment adjustment time is 3 minutes, the processor 140 may output the control signal when the travel time indicates that the host vehicle 100 is 3 minutes from the pickup location.

In some instances, the processor 140 may output the control signal a little earlier. That is, the control signal may be output in accordance with the environment adjustment time plus a predetermined buffer relative to the travel time. The predetermined buffer may be on the order of, e.g., 30 seconds to a minute and may give some additional time for the climate control system 105 to provide the appropriate cabin environment in case the host vehicle 100 arrives at the pickup location a little earlier than expected. By way of example, if the environment adjustment time is 3 minutes and the predetermined buffer is 1 minute, the processor 140 may output the control signal when the host vehicle 100 is 4 minutes (i.e., the travel time is 4 minutes) from the pickup location.

The processor 140 may not apply the same predetermined buffer in all circumstances. For instance, for very short trips or trips where the present cabin environment and target cabin environment are not much different, the predetermined buffer may be zero. For longer trips, or trips where the present cabin environment and target cabin environment are substantially different, the predetermined buffer may be longer (i.e., on the order of one or more minutes). In some instances, the predetermined buffer may be calculated from the environment adjustment time. For instance, the predetermined buffer may be a percentage of the environment adjustment time.

As an alternative or in addition to the predetermined buffer, the processor 140 may consider various circumstances that might change the environment adjustment time as the host vehicle 100 travels to the pickup location. For example, if the ambient temperature is expected to gradually increase while navigating to the pickup location, the processor 140 may estimate the effect the ambient temperature increase will have on the cabin temperature throughout the trip to the pickup location. The environment adjustment time, therefore, may be based on the predicted ambient temperature (e.g., the ambient temperature predicted around the time the climate control system 105 will need to be activated) as opposed to the present ambient temperature. Likewise, the processor 140 may consider that future weather events may negate the need for certain climate control actions. For instance, the processor 140 may determine that the ambient temperature increase will naturally defrost the windows before the host vehicle 100 arrives at the pickup location. Under this circumstance, the processor 140 need not incorporate the time to defrost the windows into the environment adjustment time estimation.

Further, since the number of passengers may affect which climate controls are activated, the processor 140 may determine the number of expected passengers from the pickup request received from the communication interface 120, determine which seats are most likely to receive passengers when the host vehicle 100 arrives at the pickup location, and communicate that information to the climate control system 105. Thus, if only one passenger is expected, the processor 140 may output the control signal so that the climate control signal limits seated heating or cooling to only the driver seat. If multiple passengers are expected, the processor 140 may output the control signal so that multiple seats may be heated or cooled (e.g., only the front seats, only the rear seats, all of the seats, etc.). Further, the processor 140 may output control signals to the climate control system 105 so that the temperature controls are adjusted according to where passengers are expected to sit (e.g., only the driver seat, only the front seats, only the rear seats, a mix of front and rear seats, etc.). If the processor 140 determines that host vehicle 100 is likely or expected to continue operating in the autonomous mode after picking up the passengers, the processor 140 may output the control signal to stop the climate control system 105 from heating or cooling the steering wheel.

The processor 140 may be programmed to keep the climate control system 105 activated until the host vehicle 100 arrives at the pickup location. In some instances, this may include the processor 140 keeping the climate control system 105 activated the entire time the environment adjustment time is less than the travel time. If the target cabin environment is reached before the host vehicle 100 arrives at the pickup location, the processor 140 may periodically activate the climate control system 105 to maintain the target cabin environment. For instance, the processor 140 may receive, from the climate control system 105, a signal indicating that the target cabin environment has been reached. The processor 140 may periodically poll the climate control system 105 for the remainder of the trip to the pickup location to determine whether the climate control system 105 needs to be activated again. Alternatively, the processor 140 may keep the climate control system 105 activated the entire time, and the climate control system 105 may be responsible for maintaining the target cabin environment without additional input from the processor 140. Accordingly, the processor 140 will output the control signal, while the host vehicle 100 is traveling to the pickup location, to activate the climate control system 105 for just a few minutes before the host vehicle 100 arrives at the pickup location, balancing fuel economy and passenger comfort.

Figure 3:
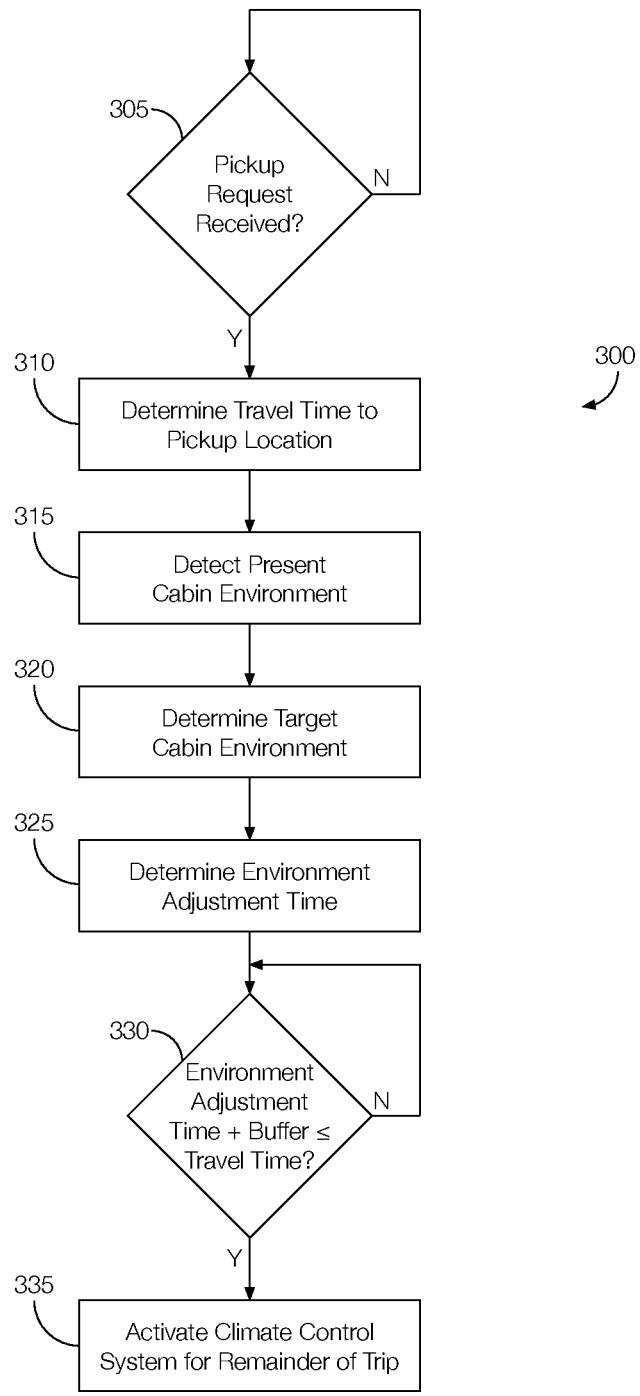
FIG. 3 is a flowchart of an example process that may be executed by the passenger comfort system to control the cabin environment while the host vehicle is operating in the autonomous mode.

FIG. 3 is a flowchart of an example process 300 that may be executed by the passenger comfort system 110 to control the cabin environment while the host vehicle 100 is operating in the non-occupant autonomous mode. The process 300 may begin any time the host vehicle 100 is on, able to operate in, or already operating in, the non-occupant autonomous mode, and ready to receive a pickup request. The process 300 may continue to execute until the host vehicle 100 is turned off, not able to operate in the non-occupant autonomous mode, or not able to receive a pickup request.

At decision block 305, the passenger comfort system 110 determines whether a pickup request has been received. The pickup request may be wirelessly transmitted from a remote device and may be received at the host vehicle 100 by the communication interface 120. The communication interface 120 may forward the pickup request, the pickup location, or another indicator that the pickup request has been received to the passenger comfort system 110. Thus, the processor 140 of the passenger comfort system 110 may determine whether the pickup request was received. Once received, the process 300 may proceed to block 310. Otherwise, the process 300 may continue to execute block 305, effectively waiting until a pickup request is received. A short delay may be applied before the process 300 repeats block 305.

At block 310, the passenger comfort system 110 determines the travel time to the pickup location. For instance, the processor 140 may determine the travel time from the navigation system 125 according to the route from the present location of the host vehicle 100 to the pickup location developed by the navigation system 125.

At block 315, the passenger comfort system 110 detects the present cabin environment. For instance, the climate control system 105 may output signals to the processor 140 that represent the present cabin environment, including the cabin temperature, the ambient (outside) temperature, frost on one or more of the windows, humidity in the cabin, or other characteristics. The processor 140 may determine the present cabin environment based, at least in part, on these or other signals output by the climate control system 105.

At block 320, the passenger comfort system 110 determines the target cabin environment. The target cabin environment may be wirelessly transmitted from the remote device, as part of the pickup request or via a separate message, and may be received at the host vehicle 100 by the communication interface 120. The communication interface 120 may forward the target cabin environment to the passenger comfort system 110. The processor 140 of the passenger comfort system 110 may determine the target cabin environment from the message received by the communication interface 120.

At block 325, the passenger comfort system 110 determines the environment adjustment time. As previously discussed, the environment adjustment time may define the amount of time for the climate control system 105 to apply various climate controls that will achieve the target cabin environment given the present cabin environment. The processor 140 may determine the environment adjustment time according to the amount of time to heat or cool the cabin, the amount of time to defrost one or more windows, etc. Further, determining the environment adjustment time may include the processor 140 comparing the present cabin environment to the target cabin environment and determining the difference between them. An example includes the processor 140 comparing the present cabin temperature to the target cabin temperature. In this example, the environment adjustment time is based on the amount of time the climate control system 105 needs to heat or cool the present cabin temperature so that it is the same as the target cabin temperature. If the difference between the present cabin environment and the target cabin environment is minimal (i.e., not much of a temperature difference, not much of a humidity difference, no frost on any of the windows, etc.), the environment adjustment time may be relatively short, on the order of a minute or so. If the difference is larger (e.g., a larger temperature difference, a larger humidity difference, frost on one or more windows, etc.), the environment adjustment time may be relatively long, on the order of 5 minutes or possibly longer.

At decision block 330, the passenger comfort system 110 determines whether the environment adjustment time, plus a predetermined buffer time, is less than or equal to the travel time. Adding the predetermined buffer to the environment adjustment time may build in extra time to achieve the target cabin environment in case, e.g., the host vehicle 100 arrives at the pickup location earlier than expected. Moreover, as previously discussed, the predetermined buffer may be zero under certain circumstances, or may be a function of the environment adjustment time. Thus, block 330 may further include the processor 140 calculating or selecting the predetermined buffer. If the processor 140 determines that the environment adjustment time plus the predetermined buffer is less than or equal to the travel time, the process 300 may proceed to block 330. Otherwise, block 330 may be repeated, periodically and after a short delay, until the environment adjustment time plus the predetermined buffer is less than or equal to the travel time.

At block 335, the passenger comfort system 110 activates the climate control system 105. That is, the processor 140 may output the control signal to the climate control system 105. In response to the control signal, the climate control system 105 may begin adjusting the cabin environment to the target cabin environment. This may include activating HVAC components, activating a heated seats feature, activating a heated mirror feature, activating a heated steering wheel feature, activating a cooled seats feature, activating a cooled mirror feature, activating a cooled steering wheel feature, at least partially opening windows, opening or venting a sunroof or moonroof, etc. The climate controls activated may be based on the number of passengers who will enter the host vehicle 100 at the pickup location. For instance, if only one passenger is identified via the pickup request, the climate controls may be limited to heating or cooling only the driver seat. If, however, the pickup request indicates that more than one passenger will enter the host vehicle 100, multiple seats may be heated or cooled (e.g., only the front seats, only the rear seats, all of the seats, etc.). Further, the temperature controls may be adjusted according to where passengers are expected to sit (e.g., only the driver seat, only the front seats, only the rear seats, a mix of front and rear seats, etc.). If the host vehicle 100 will continue to operate in the autonomous mode even after picking up the passengers, the steering wheel may not be heated or cooled as part of the climate controls. The climate control system 105 may remain activated for at least the remainder of the trip to the pickup location so that it can maintain the target cabin environment if reached before the host vehicle 100 arrives at the pickup location.

Accordingly, with the process 300, the occupants will enter a climate controlled vehicle when the host vehicle 100 arrives at the pickup location.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system, comprising a processor and a memory storing instructions executable by the processor, the instructions including:
   determining a travel time to a pickup location;
   detecting a present cabin environment;
   determining a target cabin environment;
   determining an environment adjustment time to adjust the present cabin environment to the target cabin environment; and
   activating at least one vehicle climate control in accordance with the environment adjustment time and the travel time,
   wherein the travel time is based at least in part on a route from a present location of an autonomous host vehicle to the pickup location and wherein the at least one climate control is activated when the autonomous host vehicle is autonomously traveling to the pickup location.

2. The vehicle system of claim 1, wherein the at least one vehicle climate control remains active while the environment adjustment time is less than the travel time.

3. The vehicle system of claim 1, wherein the at least one climate control is initiated when the environment adjustment time is equal to the travel time plus a predetermined buffer time.

4. The vehicle system of claim 1, wherein activating the at least one vehicle climate control includes at least one of adjusting a cabin temperature and defrosting at least one vehicle window.

5. The vehicle system of claim 1, wherein determining the environment adjustment time includes comparing the present cabin environment to the target cabin environment and determining the environment adjustment time in accordance with a difference between the present cabin environment and the target cabin environment.

6. The vehicle system of claim 5, wherein the present cabin environment includes a present cabin temperature and the target cabin environment includes a target cabin temperature, and wherein the environment adjustment time is based at least in part on an amount of time to adjust the present cabin temperature to the target cabin temperature.

7. The vehicle system of claim 1, wherein determining the target cabin environment includes wirelessly receiving a user input representing the target cabin environment.

8. A method comprising:
   determining a travel time to a pickup location;
   detecting a present cabin environment;
   determining a target cabin environment;
   determining an environment adjustment time to adjust the present cabin environment to the target cabin environment; and
   activating at least one vehicle climate control in accordance with the environment adjustment time and the travel time,
   wherein the travel time is based at least in part on a route from a present location of an autonomous host vehicle to the pickup location and wherein the at least one climate control is activated when the autonomous host vehicle is autonomously traveling to the pickup location.

9. The method of claim 8, wherein the at least one vehicle climate control remains active while the environment adjustment time is less than the travel time.

10. The method of claim 8, wherein the at least one climate control is initiated when the environment adjustment time is equal to the travel time plus a predetermined buffer time.

11. The method of claim 8, wherein activating the at least one vehicle climate control includes at least one of adjusting a cabin temperature and defrosting at least one vehicle window.

12. The method of claim 8, wherein determining the environment adjustment time includes comparing the present cabin environment to the target cabin environment and determining the environment adjustment time in accordance with a difference between the present cabin environment and the target cabin environment.

13. The method of claim 12, wherein the present cabin environment includes a present cabin temperature and the target cabin environment includes a target cabin temperature, and wherein the environment adjustment time is based at least in part on an amount of time to adjust the present cabin temperature to the target cabin temperature.

14. The method of claim 8, wherein determining the target cabin environment includes wirelessly receiving a user input representing the target cabin environment.

15. A vehicle system comprising:
   a navigation system programmed to generate a route from a present location of an autonomous host vehicle to a pickup location;
   a climate control system programmed to execute at least one vehicle climate control adjustment;
   at least one sensor programmed to detect a present cabin environment; and
   a processor programmed to determine a travel time to the pickup location, determine a target cabin environment, determine an environment adjustment time to adjust the present cabin environment to the target cabin environment, and output a control signal to the climate control system in accordance with the environment adjustment time and the travel time while the autonomous host vehicle is autonomously navigating to the pickup location,
   wherein the control signal activates the climate control system.

16. The vehicle system of claim 15, wherein the processor is programmed to initiate the climate control system when the environment adjustment time is equal to the travel time plus a predetermined buffer time and where in the processor is programmed to keep the climate control system activated while the environment adjustment time is less than the travel time.

17. The vehicle system of claim 16, wherein the processor is programmed to determine the environment adjustment time by comparing the present cabin environment to the target cabin environment and determining the environment adjustment time in accordance with a difference between the present cabin environment and the target cabin environment.

18. The vehicle system of claim 17, wherein the present cabin environment includes a present cabin temperature and the target cabin environment includes a target cabin temperature, and wherein the environment adjustment time is based at least in part on an amount of time to adjust the present cabin temperature to the target cabin temperature.

* * * * *